United States Patent
Hwang et al.

(10) Patent No.: US 9,563,818 B2
(45) Date of Patent: Feb. 7, 2017

(54) SYSTEM FOR ASSOCIATING TAG INFORMATION WITH IMAGES SUPPORTING IMAGE FEATURE SEARCH

(71) Applicant: Samsung Electronics Co., Ltd., Gyeonggi-do (KR)

(72) Inventors: Min-Kyung Hwang, Seoul (KR); Doo-Suk Kang, Seoul (KR); Sae-Mee Yim, Gyeonggi-do (KR); Eui-Chang Jung, Seoul (KR); Bo-Kun Choi, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 31 days.

(21) Appl. No.: 14/083,773

(22) Filed: Nov. 19, 2013

(65) Prior Publication Data

US 2014/0140630 A1    May 22, 2014

(30) Foreign Application Priority Data

Nov. 20, 2012    (KR) .................. 10-2012-0131539

(51) Int. Cl.
   *G06K 9/68* (2006.01)
   *G06K 9/62* (2006.01)
   *G06F 17/30* (2006.01)

(52) U.S. Cl.
   CPC ....... *G06K 9/6202* (2013.01); *G06F 17/30256* (2013.01); *G06F 17/30265* (2013.01)

(58) Field of Classification Search
   CPC ............ G06F 17/30247; G06F 17/3079; G06F 17/30867; G06F 17/30256; G06K 9/6202
   USPC .................................. 382/218, 118; 709/206
   See application file for complete search history.

(56) References Cited

U.S. PATENT DOCUMENTS

| 7,716,157 | B1 | 5/2010 | Bourdev et al. |
| 8,154,644 | B2 | 4/2012 | Thorn |
| 2006/0274978 | A1 | 12/2006 | Fukuda et al. |
| 2008/0297617 | A1 | 12/2008 | Jeong |
| 2009/0324137 | A1 | 12/2009 | Stallings et al. |
| 2010/0115036 | A1* | 5/2010 | Rosner et al. ................. 709/206 |
| 2010/0303342 | A1* | 12/2010 | Berg et al. ..................... 382/155 |
| 2011/0044512 | A1 | 2/2011 | Bambha et al. |

(Continued)

FOREIGN PATENT DOCUMENTS

| KR | 10-2008-0105723 A | 12/2008 |
| WO | 2010/024992 A1 | 3/2010 |

OTHER PUBLICATIONS

Shen et al; "Automatic Tag Generation and Ranking for Sensor-rich Outdoor Videos"; 2011; p. 1; School of Computing, National University of Singapore; Integrated Media Systems Center, University of Southern California.

(Continued)

*Primary Examiner* — Manuchehr Rahmjoo
(74) *Attorney, Agent, or Firm* — Cha & Reiter, LLC

(57) ABSTRACT

A system derives and associates tag information with an image supporting image feature search. The system receives arrangement search information used for searching for one or more images including a target object associated with a specific arrangement of tag information. The system analyzes the tag information of the images, and searches for an image having the arrangement information which satisfies the arrangement search information.

13 Claims, 14 Drawing Sheets

(56) References Cited

U.S. PATENT DOCUMENTS

2011/0268323 A1* 11/2011 Gallagher .................... 382/118
2012/0230589 A1* 9/2012 Baba et al. .................. 382/192

OTHER PUBLICATIONS

Wang et al.; "JIGSAW: Interactive Mobile Visual Search with Multimodal Queries", 2011, pp. 1-10, University of Science and Technology of China, Microsoft Research Asia.

* cited by examiner

SYSTEM FOR ASSOCIATING TAG INFORMATION WITH IMAGES SUPPORTING IMAGE FEATURE SEARCH

CROSS RELATED APPLICATION

This application claims the priority under 35 U.S.C. §119(a) to Korean Application Serial No. 10-2012-0131539, which was filed in the Korean Intellectual Property Office on Nov. 20, 2012, the entire content of which is hereby incorporated by reference.

TECHNICAL FIELD

The present disclosure relates a system for deriving and associating tag information with images supporting image feature search.

BACKGROUND

Multimedia devices such as smart phones and tablet PCs often include a camera for photographing an image, or various programs for managing an acquired image and stored in the multimedia device. A user of a known multimedia device may use tag information combined with an image in order to search for a desired image. The known tag information is combined with the image, and includes a generation time and a generation place of the image, and information on various objects or people included in the image.

When searching for an image by using the tag information in known systems, a user may input a search word to search for a desired image. For example, the user may input a name for a specific person as a search word, thereby searching for an image of the specific person. However known search systems offer limited capability of searching for people and objects in images and often produce undesired results frustrating a user and wasting valuable time and resources. Also in known search systems a search for a desired image involves separately identifying search results for a specific search word leading to a cumbersome, multi-step, error prone search process. A system according to invention principles addresses these deficiencies and related problems.

SUMMARY

The inventors have advantageously recognized a need to be able to search for an image in which a person or object is situated at a specific location within an image and/or at a specific geographic location and/or is located in a specific area of multiple images photographed showing substantially the same place or scene. The system derives tag information, associates the tag information with an image or a part of the image supporting performing an image search to facilitate search for a desired image.

In an embodiment, the system processes tag information by recognizing at least one target included in an image, generating arrangement information for prescribing a name of the at least one recognized target, and a target area in which the target is located on the image. The system combines the generated arrangement information as tag information with the image. An image searching method uses tag information, receives arrangement search information for searching for an image including a target having a specific arrangement. The search is performed of images which include arrangement information of at least one target included in the images, as tag information. The system analyzes the tag information of the images, and searches for an image having the arrangement information which satisfies the arrangement search information.

In another embodiment, a tag information storing apparatus includes a memory which stores at least one image. A controller recognizes at least one target included in an image, generates arrangement information which prescribes a name of the at least one recognized target and a target area in which the target is located on the image, and combines and associates the generated arrangement information as tag information with the image. In another embodiment, an image searching apparatus uses tag information and includes an input unit for receiving arrangement search information for searching for an image including a target having a specific arrangement. The search is performed of multiple images individually including tag information identifying an arrangement of at least one target shown in the images. A controller analyzes the tag information and searches for an image having arrangement information which satisfies the arrangement search information. The system facilitates search for an image having a desired arrangement of a target.

In another embodiment, an image searching method using tag information includes receiving a search area and a search word, comparing the search area and the search word with a target area and a name of the target included in the tag information corresponding to each of images, displaying at least one image comprising the target of the search word on the search area among the images as comparing results.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Hereinafter, in describing the present invention, detailed descriptions related to well-known functions or configurations will be omitted when they may make subject matters of the present invention unnecessarily obscure.

Hereinafter, in describing embodiments of the present invention, for convenience of description, although it is assumed that a media device includes a touch screen, the present invention is not limited thereto and may be applied to devices including various means capable of replacing an input function and a display function of the touch screen. For example, the embodiments of the present invention may be applied to various devices including an input device such as a mouse and a digitizer, and a display device such as a monitor.

Hereinafter, the media device refers to a device which can perform at least one of recording and display of various media such as an image and a text, and is used with the meaning of a device including a cell phone, a smart phone, a navigation unit, a personal digital assistant (PDA), a portable multimedia player (PMP), a moving picture experts group layer 3 (MP3) player, a game machine, a tablet PC, a net-book computer, a desktop computer, a notebook computer, an internet-connected communication terminal, and a broadcast-receivable communication terminal. As used herein "tag information" comprises image metadata associated with an image and where the metadata provides information about content of the image.

Hereinafter, the embodiments of the present invention will be described with reference to the accompanying drawings.

Figure 1B:
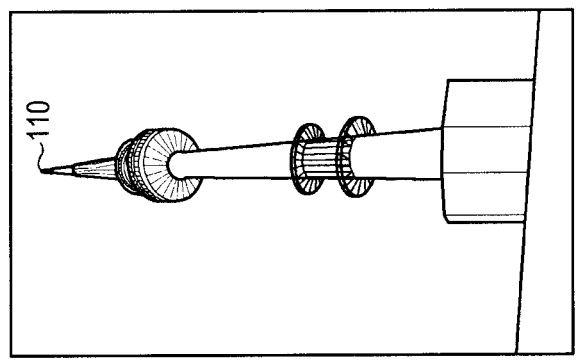
FIGS. 1A, 1B, 1C, 1D and 1E show operation of a system according to an embodiment of the present invention.
Figure 1A:
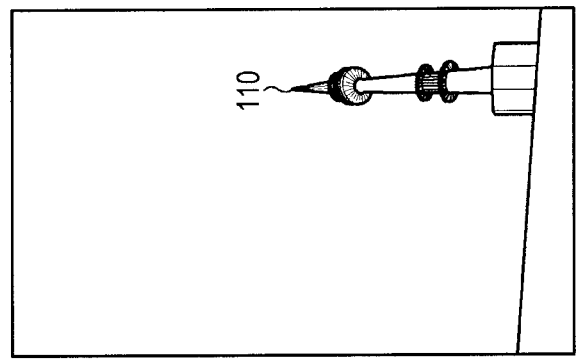

FIGS. 1A to 1E show operation of a system in images including a Seoul tower 110 as shown in FIGS. 1A and 1B that are stored with other images in a media device. The Seoul tower 110 is located in a central area of the image shown in FIG. 1A, and is located on a right lower side of the image shown in FIG. 1B. A user desires to search for an image in which the Seoul tower 110 is located in a central area, for example. A known search method in which a name of a target is included in the image and stored as tag information, returns all the images showing the Seoul tower 110 including the images of FIGS. 1A and 1B.

In contrast a system according to invention principles returns search results showing images (e.g. FIGS. 1A, 1D) showing the Seoul tower in a central image area excluding images showing the tower in a non-central image area. The system stores tag information identifying a target area at which the target included in the image is located in the image, and the target area is utilized when searching for the image. The system advantageously facilitates search for an image in which a specific target desired by the user is located at a specific area. Thus, a media device receives user entered (or system derived) search information identifying a specific search area of an image and a search word for the target used for search for the target in a specific the area of an image and searches for the image in response to the input search information.

Figure 1E:
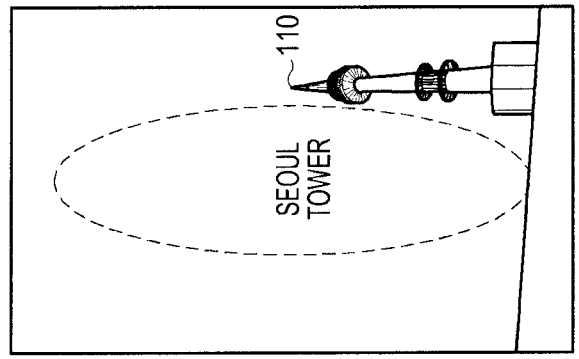
Figure 1D:
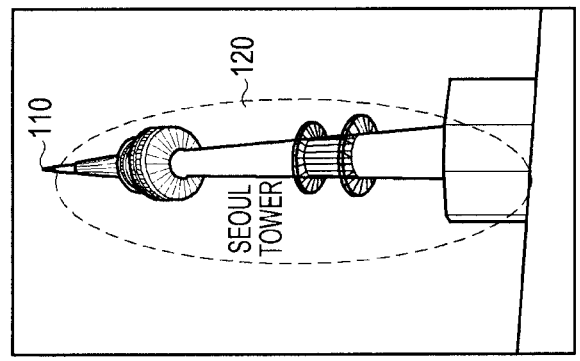
Figure 1C:
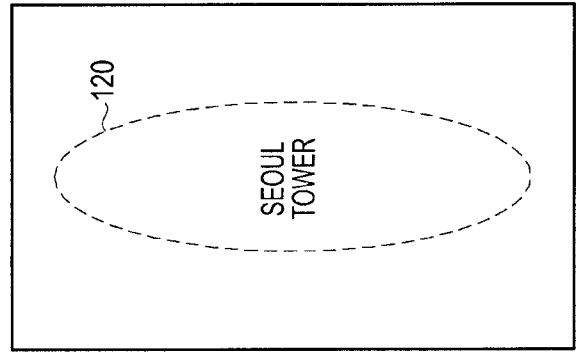

For example, in response to a user selecting a portion of a display area of the media device and inputting a search word corresponding to the selected area 120 on an image search screen as shown in FIG. 1C, the media device searches for an image in which the target corresponding to the input search word is located at an area corresponding to the selected area 120 and provides a search result to the user. Accordingly, when the user designates 'Seoul tower' as a target item to be searched for at the selected search area 120, the media device searches for an image in which 'Seoul tower' is included at the area corresponding to the search area 120.

FIG. 1D shows an example illustrating a screen on which the image shown in FIG. 1A is compared with the search information which the user inputs. The Seoul tower 110 is included in the area corresponding to the search area 120 designated by the user, so the media device determines the image as an image which the user desires to find, and shows the user the search result. Similarly, FIG. 1E shows comparison of the image of FIG. 1B with the search information which the user inputs. The Seoul tower 110 is not included in the area corresponding to the search area 120 designated by the user, so the media device determines that the image fails to meet the user search criteria. The search system returns the FIG. 1A image as a search result excluding FIG. 1B in contrast a known system incorrectly returns both FIGS. 1A and 1B. The system advantageously stores information on the target area at which the target included in the image is located in the image as tag information in advance and uses the tag information in a search.

Figure 2:
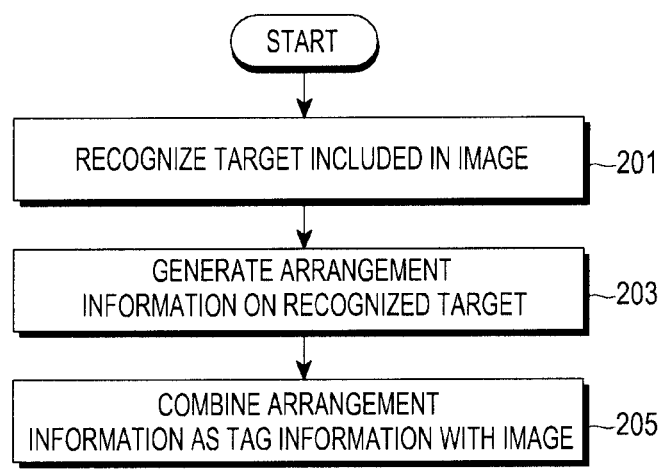
FIG. 2 shows a flowchart illustrating a method of processing tag information according to an embodiment of the present invention.

FIG. 2, shows a process for storing the information on the target area at which the target is located in the image as tag information. The information on the target area is stored together with a name of the target, and hereinafter, the information on the target area, and the name of the target are referred to as arrangement information.

In step 201, a media device recognizes at least one target included in an image. The image may correspond to an image which was previously stored in the media device, or an image which is generated by photography with a camera loaded in the media device. That is, the recognition of the target may be automatically performed during photographing with a camera, or may be performed on images already stored in the media device during executing a specific menu function. Different known recognition methods may be employed to recognize a target. Different known recognition methods may be used to recognize a face, half a body, a whole body, or a posture of a person. An application related to social networking or an address book may be used for human feature recognition. For example, human feature recognition may be performed based on photograph information of a person registered with an executable application or in an address book. Different known recognition methods employing location information may be applied to object recognition. For example, object recognition methods using global positioning system (GPS) information or peripheral map information may be applied. Moreover, object recognition methods which use sensing information on a viewing angle in addition to GPS information or peripheral map information may be applied, so an erroneous target recognized as an object is excluded and not incorporated as tag information in image data. This reduces erroneous search results and complexity of a process necessary for recognizing an object. In step 203, the media device generates arrangement information of the recognized target. As described above, the arrangement information includes the name of the target, and information on the target area within an image. That is, the arrangement information includes information on which area of an image a target is to be recognized.

In step 205, the media device combines the generated arrangement information as tag information with the image. The tag information combined with the image, further includes a time when the image is generated, and a place where the image is generated, in addition to the arrangement information.

Figure 3:
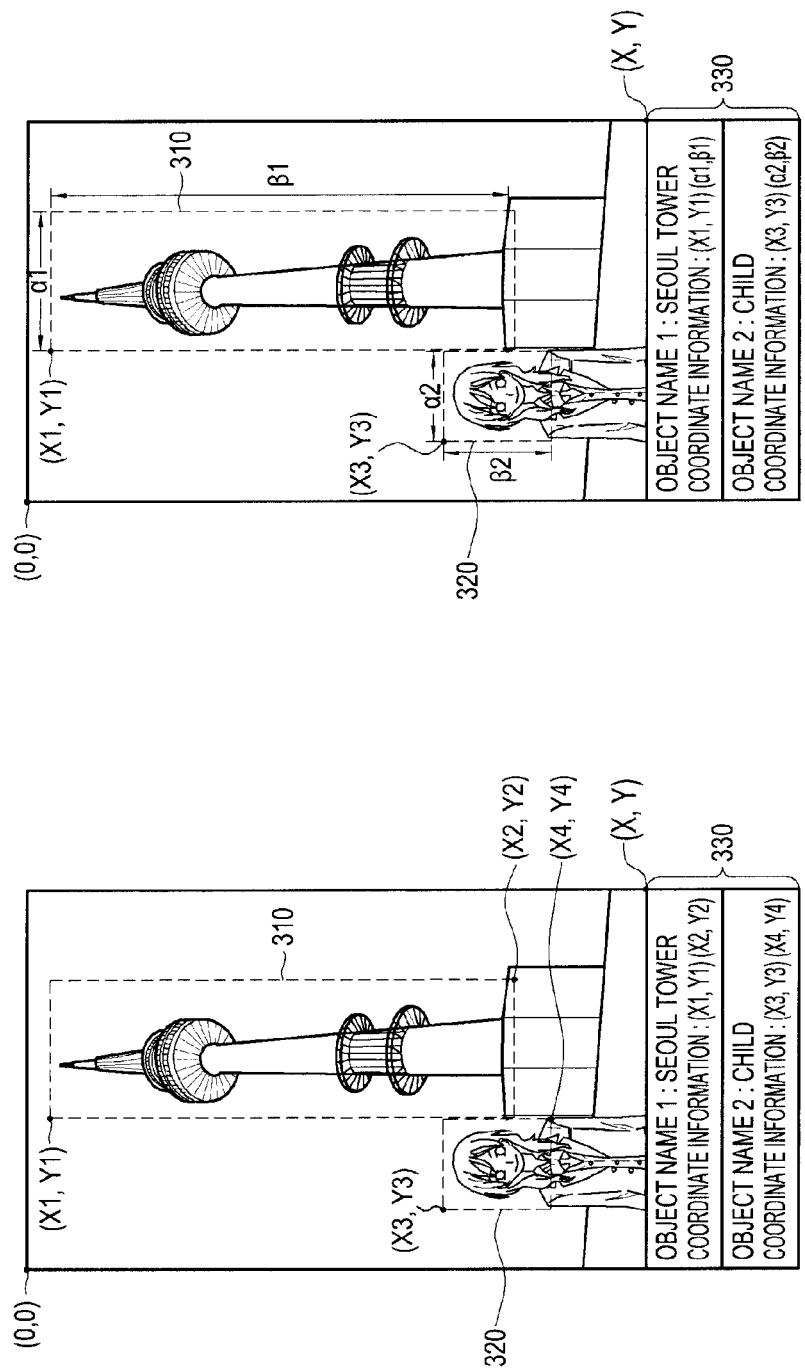
FIGS. 3A and 3B illustrate a tag information storing method according to embodiments of the present invention.

Embodiments of the above-described tag information storing method are described with reference to FIGS. 3A and 3B. The media device recognizes a target included in an image previously stored or in an image generated by photography. For example, FIGS. 3A and 3B show two targets 310 and 320 are recognized in one image. When the targets 310 and 320 are recognized, the media device generates arrangement information of the targets 310 and 320. As described above, the arrangement information corresponds to information by which the target area at which the target is located in the image and may be used to extract and display the target area. The target area may be displayed in various forms, for simplification of calculation and minimization of stored information, a target area comprising a rectangular form is described. However, the present invention is not limited thereto, and a target area comprises a looped curve, circle sphere, oval, irregular shape or another shape surrounding an outer periphery of a recognized target. A rectangular target area is definable by coordinate information with a predetermined point, for example an upper-left vertex of the image, serving as a start point.

An upper-left vertex of the image corresponds to coordinates (0,0), and a lower-right vertex of the image corresponds to coordinates (X,Y), the target area of the target 310 may be prescribed with coordinates (X1, Y1) closest to the coordinates (0,0), and coordinates (X2, Y2) farthest from the coordinates (0,0), and the target area of the target 320 may be prescribed with coordinates (X3, Y3) closest to the coordinates (0,0), and coordinates (X4, Y4) farthest from the coordinated (0,0).

Alternatively, the target area may be prescribed with a different set of coordinates, and vertical and horizontal lengths with respect to the coordinates as shown in FIG. 3B. A target area 310 may be prescribed with coordinates (X1, Y1) closest to coordinates (0,0), and a horizontal length al and a vertical length 131 with respect to the coordinates (X1, Y1), and the target area 320 may be prescribed with coordinates (X3, Y3) closest to the coordinates (0,0), and a horizontal length α2 and a vertical length 132 with respect to the coordinates (X3, Y3). When the target areas 310 and 320 are determined, the media device generates arrangement information 330 where the determined coordinate information is associated with (mapped to) the name of the corresponding target to provide combined generated arrangement information 330 as tag information for association with the image.

Figure 4:
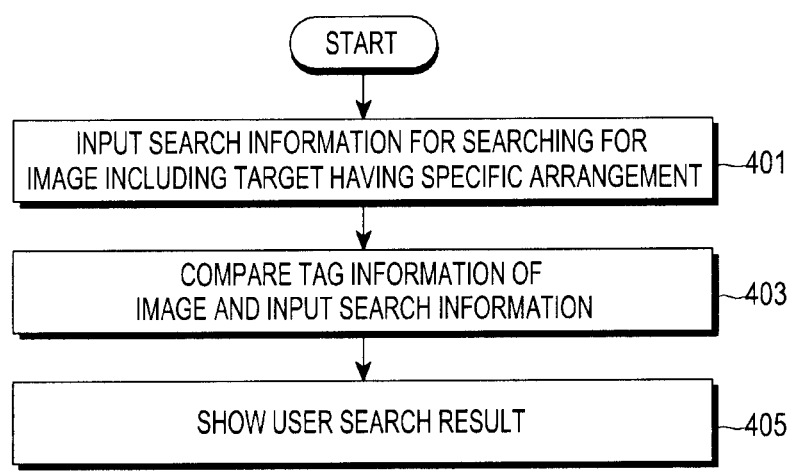
FIG. 4 shows a flowchart of an image searching method according to an embodiment of the present invention.

FIG. 4 shows a flowchart of an image searching method. In step 401, a media device receives, from a user, search information (hereinafter, referred to as arrangement search information) for searching for an image including a target object and having a specific arrangement. Here, the arrangement search information refers to information for searching for a target object in a specific area of an image. The arrangement search information includes a search area for searching for a specific target, and a search word used for performing the search in the search area.

Figure 5A:
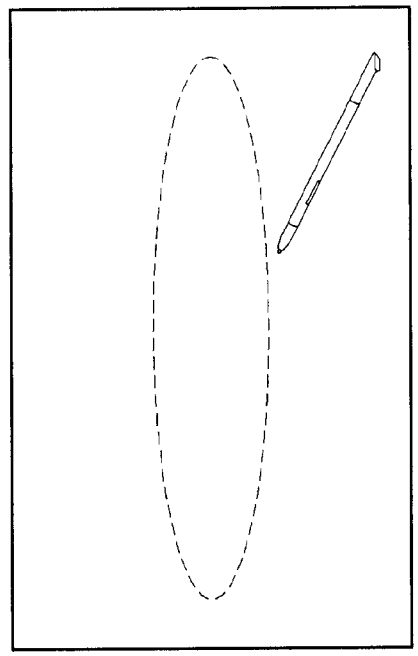
FIGS. 5A, 5B, 5C, 5D, 5E, 5F and 5G illustrate operation of a process of inputting arrangement search information according to an embodiment of the present invention.

FIGS. 5A to 5G illustrate operation of a process of inputting arrangement search information. In an embodiment a display screen includes a predetermined number of divided display areas provided to a user, and a search area is selected in response to user selection of one or more of the divided display areas. Alternatively, the selection of the search area may be performed by other methods including by determining a looped curve as a search area with an electronic pen, as shown in FIG. 5A.

Figure 5B:
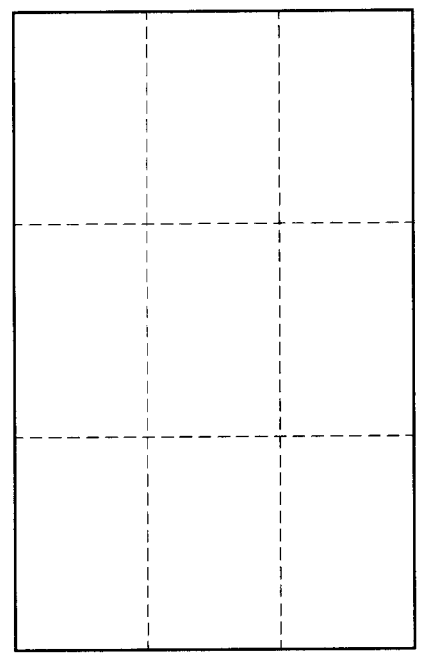
Figure 5C:
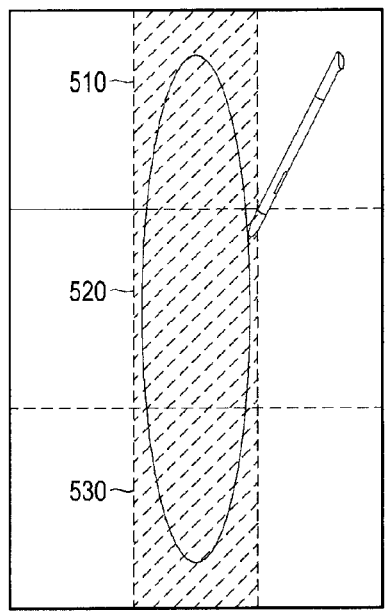
Figure 5D:
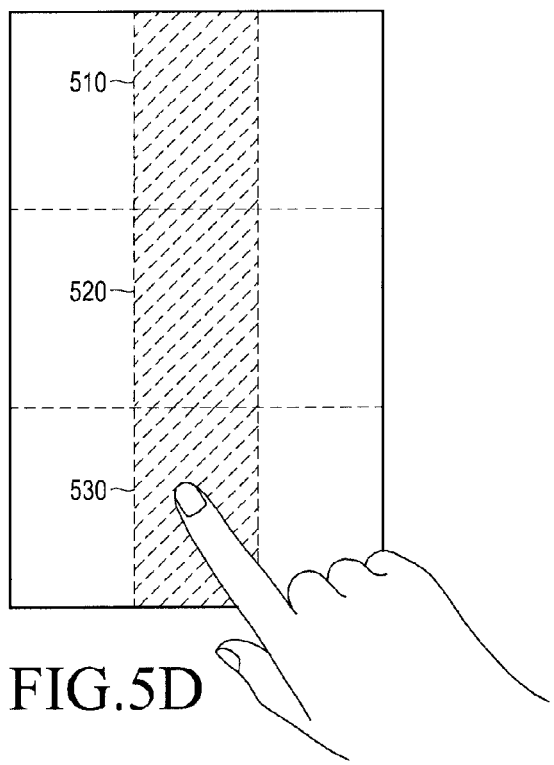
Figure 5E:
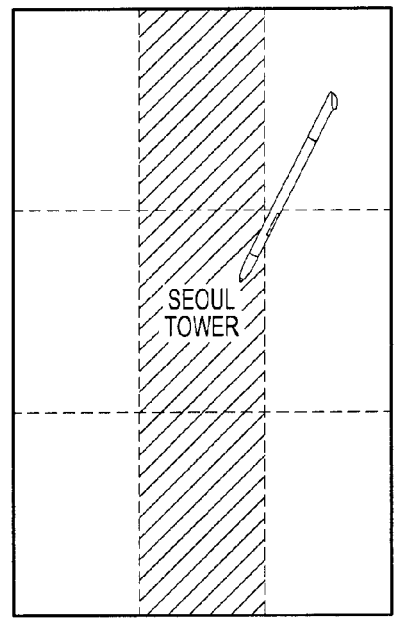
Figure 5F:
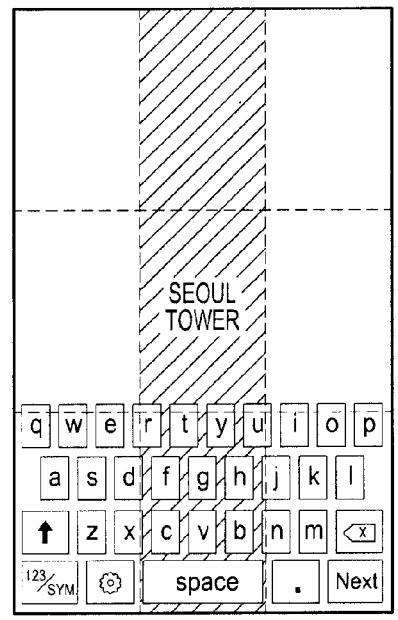
Figure 5G:
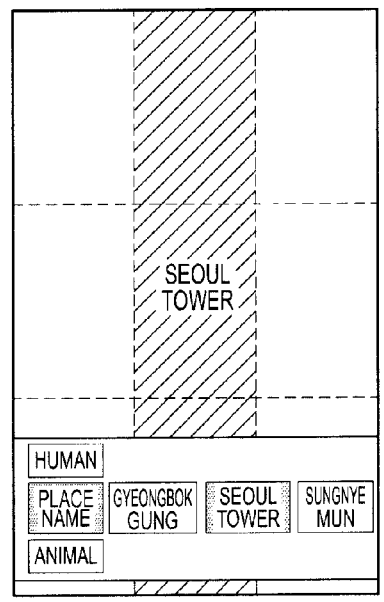

In response to a user executing a menu for image search, a media device provides a screen including a predetermined number of divided display areas to the user as shown in FIG. 5B. A user selects a search area, using the displayed screen. In an embodiment of the present invention, the selection of the search area may be performed by touch and a drag or by using an electronic pen or a finger, by cursor movement or another method. The media device determines that division areas 510, 520, and 530 in which an area traced by an electronic pen is included are selected as a search area as shown in FIG. 5C. The media device may alternatively determine, for example, that the division areas 510, 520, and 530 in which touch operations are separately performed, single division area 510 in which a touch operation is performed, or division areas 520 and 530 in which a drag operation is performed are selected as a search area as shown in FIG. 5D. In response to a search area being selected, the media device provides a menu for inputting a search word which is used to perform a search in the search area. The input of the search word may be performed by writing with the electronic pen as shown in FIG. 5E, by an input through a displayed keyboard as shown in FIG. 5F, or by selecting words provided in a drop menu as shown in FIG. 5G.

Referring to FIG. 4, in step 403, the media device compares the arrangement information of the stored images with the input arrangement search information. That is, the media device analyzes the arrangement information combined with the images to search for an image satisfying the input arrangement search information. In an embodiment, the image search is performed by searching an image including the input search word as associated arrangement information. A target area at which a target object is located and the input search area are compared with each other in the selected images.

Figure 6A:
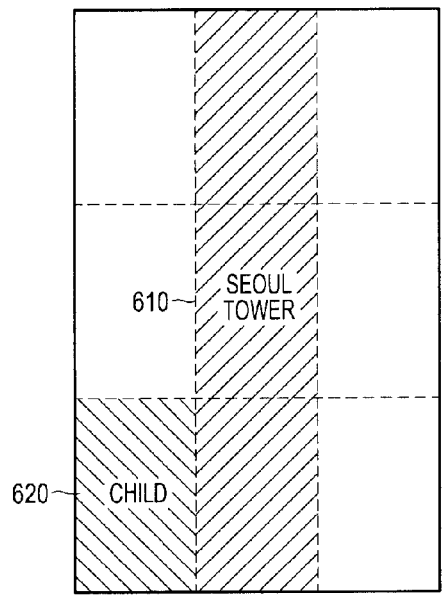
FIGS. 6A, 6B, 6C and 6D illustrate operation of a process of performing an image search according to an embodiment of the present invention.
Figure 6B:
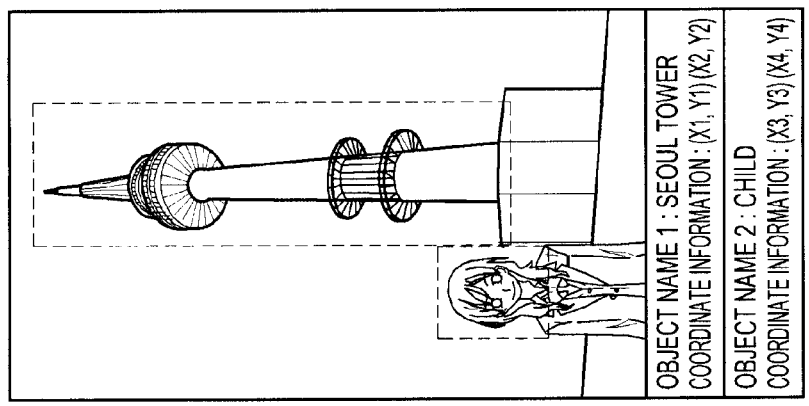
Figure 6C:
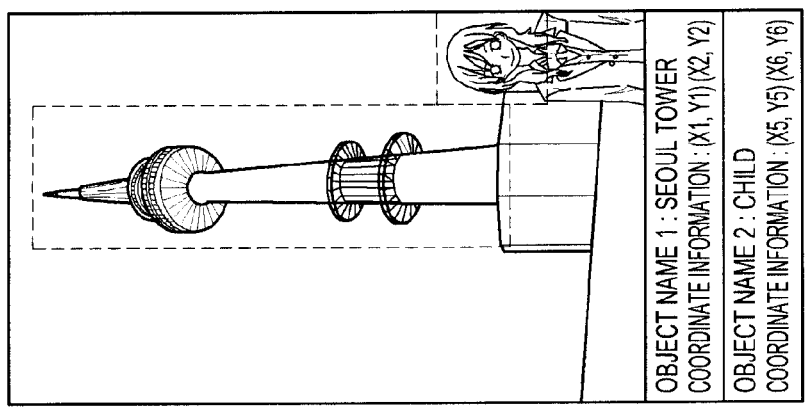
Figure 6D:
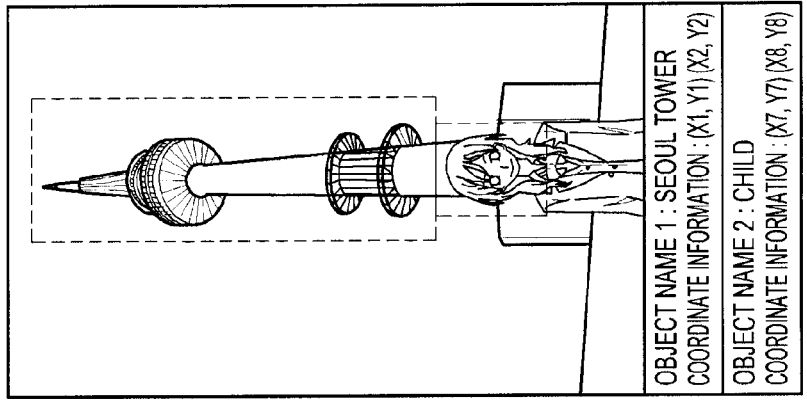

FIGS. 6A and 6D illustrate operation of a process of performing an image search. In response to arrangement search information being input as shown in FIG. 6A, a media device searches multiple stored images and to find and select an image in which 'child' and 'Seoul tower' are stored as arrangement information. Thereafter, the media device searches for a particular image or images satisfying the input arrangement search information. Specifically, the media device searches for the image in which 'Seoul tower' is located at an area corresponding to a search area 610, and 'child' is located at an area corresponding to a search area 620. The media device determines of the images of FIGS. 6B to 6D, the image satisfying the input arrangement search information, that is the image in which 'Seoul tower' and 'child' are located at the areas corresponding to the search area 610 and the search area 620, respectively comprises the image of FIG. 6B (the search result).

Figure 7A:
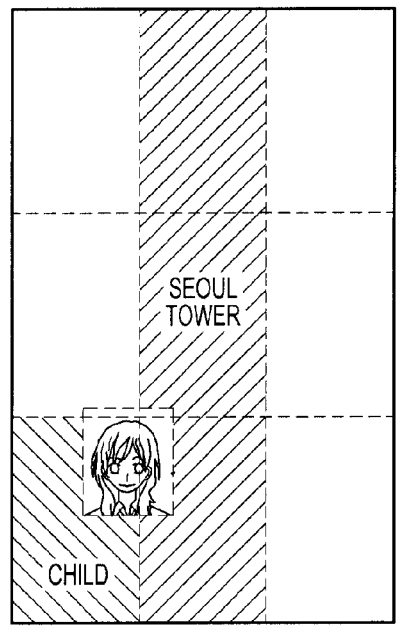
FIGS. 7A and 7B illustrate an image search condition according to an embodiment of the present invention.
Figure 7B:
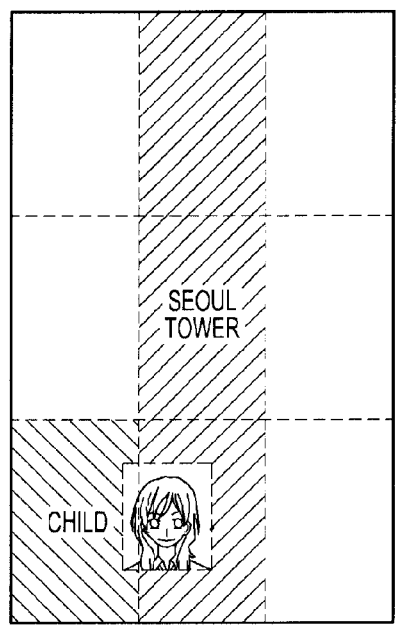

The media device may be configured to determine a search condition is satisfied when the search area and the target area overlap each other by a predetermined amount as well as when a candidate search area substantially coincides with a target area. For example, when the predetermined amount is 50%, the media device may determine that the image shown in FIG. 7A satisfies the arrangement search information, and the image shown in FIG. 7B fails to satisfy the arrangement search information. Further, multiple search words may be input and the media device supports search for an image including one or more or all of multiple target objects corresponding to the multiple search words in response to user entered search criteria and search operators (and, or, excluding, for example) linking search terms.

Figure 8A:
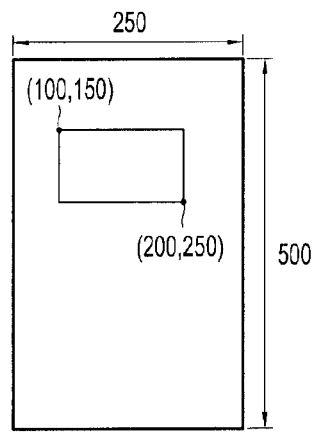
FIGS. 8A and 8B illustrate a process of adjusting a resolution according to an embodiment of the present invention.
Figure 8B:
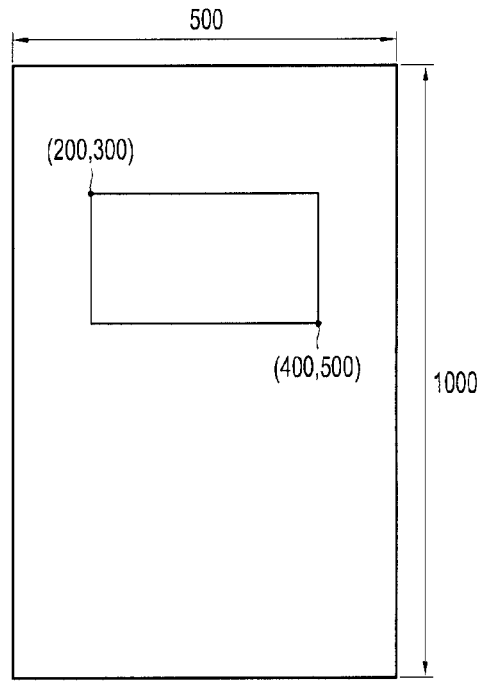

A resolution of a search result image may be different from a display resolution of the media device and the media device performs an operation for matching the resolution of the image with the display resolution of the media device before comparing the search area with the target area. The media device may adjust coordinate information of a target object with respect to a display resolution of the media in response to a ratio of the resolution of the image to the display resolution of the media device. For example, suppose a resolution of an image being searched is 250×500 as shown in FIG. 8A, and the display resolution of the media device is 500×1000 as shown in FIG. 8B. Since the display resolution of the media device is double the resolution of the image, coordinate transformation doubling coordinate values of the target included in the image is performed. That is, coordinate information (100, 150) and (200, 250) of the target as shown in FIG. 8A is adjusted to coordinate information (200, 300) and (400, 500). The media device performs the comparison of the target area to the search area, after adjusting the coordinate information.

Figure 9A:
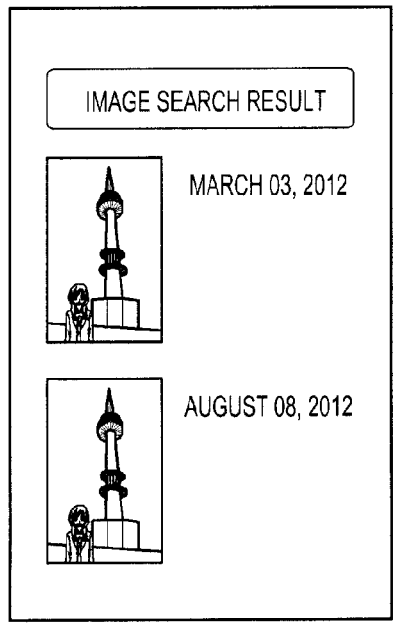
FIGS. 9A and 9B show an image search result screen according to an embodiment of the present invention.
Figure 9B:
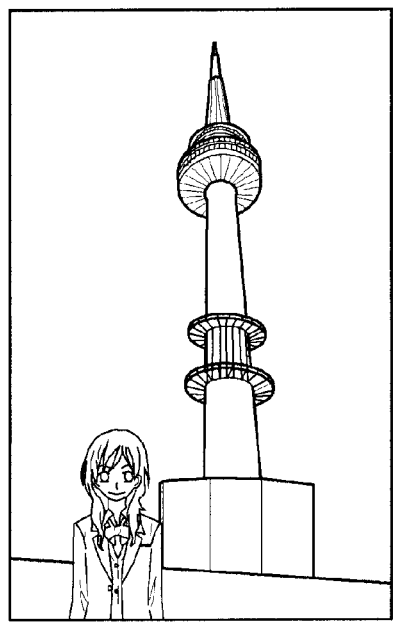

Referring back to FIG. 4, in step 405, the media device shows the user the search result. FIGS. 9A and 9B show an image search result screen. The media device displays an image search result as a thumbnail as shown in FIG. 9A. The media device may display various types of information such as a time when the corresponding image was generated, together with the image search result, with reference to the tag information or metadata of the searched image. Moreover, the media device displays a search result in the whole display area as shown in FIG. 9B. A next search result image is displayed in response to user command e.g., a user swipe operation. A search result guidance screen gives a priority order to searched images showing search result images in order. For example, the media device may prioritize an image having maximum overlapping area between the search area and the target area.

Figure 10:
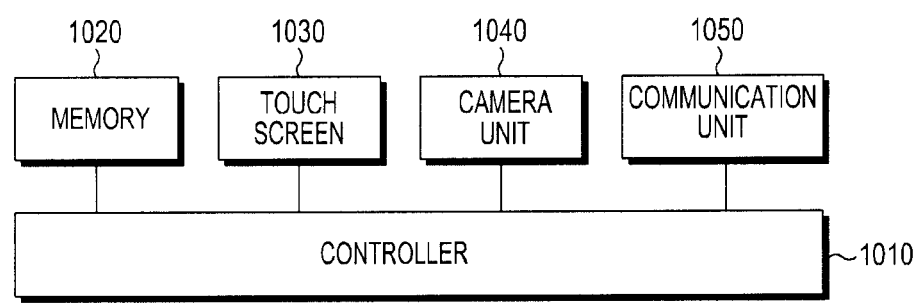
FIG. 10 shows a block diagram of an apparatus to which the embodiments of the present invention are applied.

FIG. 10 shows a system for deriving and processing tag information and associating the tag information with a particular area of an image supporting image feature search. The tag information storing method and the image searching method may be performed in separate devices. The system in different embodiments may include a touch screen, means providing input and display functions, a mouse, or a digitizer, and display devices such as a monitor.

A controller 1010 generates tag information of images transferred from a camera unit 1040 when an image is generated, or tag information of images stored in a memory 1020 in response to a command input from the user. That is, the controller 1010 recognizes at least one target included in the image, generates arrangement information for prescribing a name of the at least one recognized target, and a target area at which the target is located in the image, and combines the generated arrangement information as tag information with the image.

Moreover, the controller 1010 performs an image search based on the arrangement search information input from a user. Controller 1010 receives the arrangement search information for searching for an image including a target object having a specific arrangement. A search of images including arrangement information as tag information of at least one target object is performed. Controller 110 analyzes the tag information of candidate search result images to identify one or more search result images satisfying the input arrangement search information. Controller 1010 connects with a specific server to perform a search both for images stored in the server as well as images stored in the memory 1020.

In response to an input via an image search menu, controller 1010 displays a guide screen on touch screen 1030, enabling a user to input search criteria comprising data identifying at least one search area, and a search word for at least one target object for performing a search. Controller 1010 in one embodiment shows a screen on touch screen 1030 comprising a plurality of predetermined divided areas. Furthermore, the controller 1010 may display a keyboard for inputting the search word on the touch screen 1030, or may control the touch screen 1030 support a user written input using an electronic pen. Controller 1010 also displays a predetermined drop menu through the touch screen 1030.

The drop menu comprises a hierarchical tree menu structure in which words stored in advance are sorted according to an attribute. When a search word for a person is provided, the drop menu may be configured by using an address book stored in the media device. In response to initiating an image search based on input arrangement search information, the controller 1010 searches for one or more images where a target area at which the target object corresponding to the input search word is located is included in the image, and the target area corresponding to the search word overlaps the search location specified in the search criteria by a predetermined amount.

In response to an image search being performed, in a case where a resolution of a display area of the touch screen 1030 and a resolution of the searched images are different, the controller 1010 performs a resolution adjustment operation for matching. For example, the controller 1010 calculates the ratio of the resolution of the searched images to the resolution of the display area of the touch screen 1030, adjusts the target area depending on the calculated ratio, and compares the adjusted target area with the search area.

The memory 1020 stores a plurality of images and camera unit 1040 transfers a photographed image to the controller 110. The communication unit 1050 communicates with other media devices or servers using one of multiple different predetermined communication protocols and acquires information on images stored in particular servers.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

What is claimed is:
1. An image searching method, comprising:
   storing tag information for a plurality of images, the tag information including arrangements of target names and target areas, the target names identifying target objects and the target areas indicating regions of respective images in which the target objects are disposed;

before displaying any of the plurality of images, displaying a grid on a display, the grid partitioning a screen of the display into a plurality of display areas;

before executing any searching, receiving inputs defining a target arrangement for candidate images, the inputs including:

a search area designated by selection of one or more display areas of the grid, the selected one or more display areas indicating by disposition in the grid a region where a searched-for object is disposed within the candidate images, and a search word indicating a name of the searched-for object disposed in the search area; and searching, by a processor, for the candidate images from among the plurality of images having tag information in which a corresponding arrangement matches the target arrangement, including a target name matching the search word disposed in a target area matching the search area; and providing the candidate images.

2. The method of claim 1, wherein displaying the grid comprises lines visually demarcating the plurality of display areas.

3. The method of claim 2, wherein the selected at least one of the plurality of display areas is defined using two sets of coordinates identifying two vertices bounding the selected at least one of the plurality of display areas, and wherein display of the selected one or more display areas is visually altered in response to the selection to indicate the selection.

4. The method of claim 1, wherein receiving the input further includes selection of multiple display areas of the plurality of display areas.

5. An image and image metadata searching apparatus, comprising:

an input unit;

a memory storing tag information for a plurality of images, the tag information including arrangements of target names and target areas, the target names identifying target objects, and the target areas indicating regions of respective images in which the target objects are disposed;

a display; and at least one processor operatively coupled to the memory, configured to:

before displaying any of the plurality of images, control the display to display a grid partitioning a screen of the display into a plurality of display areas, before executing any searching, receiving, by the input unit, inputs defining a target arrangement for candidate images, the inputs including:

a search area designated by selection of one or more display areas of the grid indicating by disposition in the grid a region where a searched-for object is disposed within the candidate images, and a search word indicating a name of the searched-for object disposed in the search area, searching for candidate images from among the plurality of images having tag information in which a corresponding arrangement matches the target arrangement, including a target name matching the search word disposed in a target area matches the search area, and control the display to display search results identifying the candidate images.

6. The apparatus of claim 5, wherein the grid comprises lines visually demarcating the plurality of display areas.

7. The apparatus of claim 6, wherein the selected at least one of the plurality of display areas is defined using two sets of coordinates identifying two vertices bounding the selected at least one of the plurality of display areas, and wherein the one or more display areas is visually altered in response to the selection to indicate the selection.

8. The apparatus of claim 5, wherein receiving the input further includes selection of multiple display areas of the plurality of display areas as the search area.

9. An image searching method, comprising:

storing tag information for a plurality of images, the tag information including arrangements of target names and target areas, the target names identifying target objects, and the target areas indicating regions of respective images in which the target objects are disposed;

before displaying any of the plurality of images, displaying, by a display, a grid partitioning a screen of the display into a plurality of display areas;

before executing any searching, receiving, by an input unit, inputs defining a target arrangement including:

a search area designated by selection of one or more display areas of the grid, the selected one or more display areas indicating by disposition in the grid where a searched-for object is disposed within candidate images, and a search word indicating a name of the searched-for object disposed in the search area; and searching, via at least one processor, for the candidate images from among the plurality of images having tag information in which a corresponding arrangement matches the target arrangement including a target name matching the search word disposed in a target area matching the search area.

10. An image and image metadata searching apparatus, comprising:

an input unit;

a memory storing tag information for a plurality of images, the tag information including arrangements of target names and target areas, the target names identifying target objects, and the target areas indicating regions of respective images in which the target objects are disposed;

a display; and at least one processor operatively coupled to the memory, configured to:

before displaying any of the plurality of images, control the display to display a grid partitioning a screen of the display into a plurality of display areas that are uniform and of a predetermined number, and receive, by the input unit, inputs defining a target arrangement including a search area indicated by selection of one or more display areas of the grid, and a search word for the search area, searching, by a processor, for candidate images from among the plurality of images having particular tag information in which a corresponding arrangement matches the target arrangement including a target name matching the search word and the target area matching the search area, and control the display to display search results identifying the candidate images.

11. An image searching method, comprising:
storing tag information for a plurality of images, the tag information including arrangements of target names and target areas, the target names identifying target objects, and the target areas indicating regions of respective images in which the target objects are disposed;
before displaying any of the plurality of images, displaying, by a display, a grid partitioning a screen of the display into a plurality of display areas;
before executing any searching, receiving inputs defining a target arrangement for candidate images, including:
  a search area indicated by selection of one or more display areas of the grid, the selected one or more display areas indicating by disposition in the grid a region where a searched-for object is disposed within the candidate images, and
  a search word indicating a name of the searched-for object disposed in the search area;
searching, via a processor, for the candidate images from among the plurality of images having particular tag information in which a corresponding arrangement matches the target arrangement including a target name matching the search word disposed in a target area matching the search area; and
displaying at least one candidate image identified by the searching as a search result.

12. The method of claim 11, wherein the search word is designated by at least one of:
handwritten input executed on the selected or more display areas;
selection of keys of a displayed keypad; and
selection of a dialogue option of a displayed menu,
wherein the displayed keypad and the displayed menu are configured to be displayed overlaying at least two display areas of the grid, and
wherein the search word is displayed within the selected one or more display areas of the grid.

13. The method of claim 12, further comprising:
detecting selection of multiple display areas of the plurality of display areas and input of multiple names for multiple target objects, each target object associated with at least one of the plurality of display areas; and
displaying within each of the plurality of display areas a respective name for an associated particular target object,
wherein when the respective name is associated with the selected multiple display areas, the respective name is displayed in only one display area of the selected multiple display areas.

* * * * *